_(12)_ United States Patent
Burstein et al.

(10) Patent No.: US 7,992,122 B1
(45) Date of Patent: Aug. 2, 2011

(54) METHOD OF PLACING AND ROUTING FOR POWER OPTIMIZATION AND TIMING CLOSURE

(75) Inventors: Michael Burstein, Cupertino, CA (US); Boris Ginzburg, Santa Clara, CA (US)

(73) Assignee: GG Technology, Inc., San Jose, CA (US)

( * ) Notice: Subject to any disclaimer, the term of this patent is extended or adjusted under 35 U.S.C. 154(b) by 464 days.

(21) Appl. No.: 11/093,713

(22) Filed: Mar. 25, 2005

(51) Int. Cl.
*G06F 17/50* (2006.01)

(52) U.S. Cl. ........ 716/131; 716/113; 716/124; 716/126; 716/130; 716/134; 703/19

(58) Field of Classification Search ................ 716/7, 10, 716/5, 6, 119, 124–126, 130, 132–134; 703/19
See application file for complete search history.

(56) References Cited

U.S. PATENT DOCUMENTS

| | | | |
|---|---|---|---|
| 6,230,304 B1* | 5/2001 | Groeneveld et al. ............... 716/7 |
| 6,453,446 B1 | 9/2002 | van Ginneken | |
| 6,507,941 B1 | 1/2003 | Leung et al. | |
| 6,519,745 B1 | 2/2003 | Srinivas et al. | |
| 6,553,338 B1 | 4/2003 | Buch et al. | |
| 6,725,438 B2 | 4/2004 | van Ginneken | |
| 6,845,494 B2 | 1/2005 | Burks et al. | |
| 6,851,095 B1 | 2/2005 | Srinivasan et al. | |
| 2002/0112220 A1* | 8/2002 | Miller .............. 716/10 |
| 2004/0031010 A1* | 2/2004 | Kaida .............. 716/12 |
| 2006/0168551 A1* | 7/2006 | Mukuno .............. 716/5 |
| 2006/0277520 A1* | 12/2006 | Gennari .............. 716/21 |

* cited by examiner

*Primary Examiner* — Paul Dinh
*Assistant Examiner* — Nha T Nguyen
(74) *Attorney, Agent, or Firm* — The Law Offices of Andrew D. Fortney; Andrew D. Fortney

(57) ABSTRACT

A method, algorithm, software, architecture and/or system for placing circuit blocks and routing signal paths or connections between the circuit blocks in a circuit design is disclosed. In one embodiment, a method of placing and routing can include: (i) routing signal paths in one or more upper metal layers for connecting circuit blocks; (ii) adjusting the circuit blocks based on electrical characteristics of the signal paths; and (iii) routing in one or more lower metal layers connections between the circuit blocks and the upper layers. The circuit blocks can include standard cells, blocks, or gates configured to implement a logic or timing function, other components, and/or integrated circuits, for example. Embodiments of the present invention can advantageously reduce power consumption and improve timing closure in an automated place-and-route flow.

30 Claims, 6 Drawing Sheets

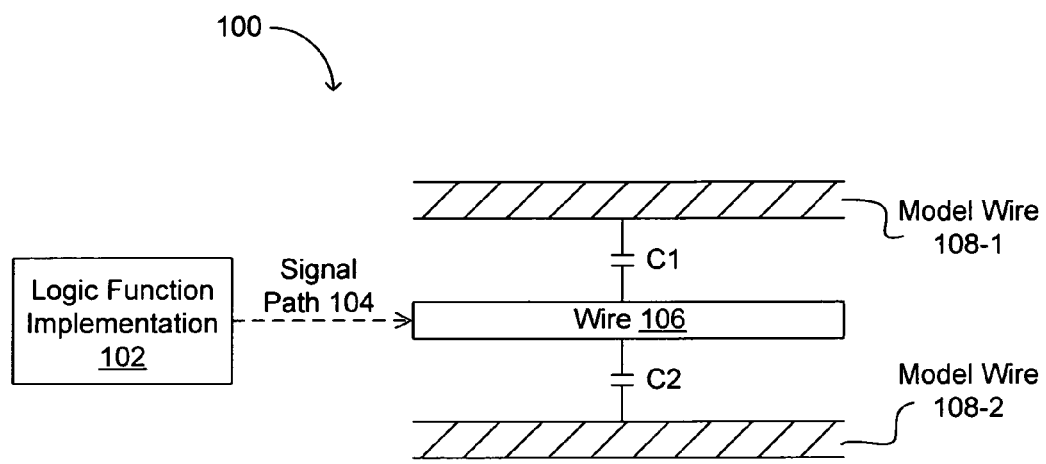
FIG. 1 (conventional)

METHOD OF PLACING AND ROUTING FOR POWER OPTIMIZATION AND TIMING CLOSURE

FIELD OF THE INVENTION

The present invention generally relates to the field of circuit design, particularly integrated circuit (IC) design. More specifically, embodiments of the present invention pertain to methods, algorithms, software, systems and architectures for reducing power consumption in the design of an IC.

DISCUSSION OF THE BACKGROUND

In typical circuit design, circuit components are arranged to optimize space and/or circuit performance. Such arrangements can include the "layout" or pattern definition of each of the layers used in a semiconductor manufacturing process. For example, such layout can include metal interconnect or connectivity layers that are converted to masks or reticles for use in a wafer fabrication facility that manufactures ICs (i.e., "chips").

While some circuits are designed using "custom" layout, others are designed using a partially or fully automated design flow. Application-Specific Integrated Circuit (ASIC) designs, as well as other functional blocks within a larger chip, such as System-On-Chip (SOC) designs, may employ custom and/or ASIC type flows on the same chip. In any event, typical ASIC flows use "place-and-route" tools for placing logic or circuit "blocks" and then "routing" or connecting the interface signals between the blocks. Such routing between circuit blocks is typically done using one or more metal connectivity layers for each signal path. In most modern ASIC designs, at least five layers of metal connectivity are employed.

In conventional place-and-route flows, circuit blocks or "cells" are first placed in desired locations and sized (i.e., adjust drive strength by changing transistor sizes and/or adding buffer stages) in accordance with a projected routing and capacitive load based on these desired cell locations. Then, signals are actually routed between the circuit blocks. A drawback of such an approach is that the cell sizing is done based on an estimated routing that typically provides capacitance values that are worse than the actual routing path. Referring now to FIG. 1, a conventional wire routing estimation approach is shown and indicated by the general reference character 100. Logic Function Implementation 102 can be any circuit block or cell that includes a driver stage to be sized in accordance with a resistance and capacitance (RC) load on Signal Path 104. Wire 106 can be a projected routed path or segment. Model Wire 108-1 can be an estimated wire route adjacent to (i.e., "above" or "below" on different routing layers or side-by-side on the same routing layer) Wire 106, contributing a capacitance C1. Similarly, Model Wire 108-2 can be another estimated wire route adjacent to Wire 106, contributing a capacitance C2. In essence, full coverage both above and below in different routing layers (and/or side-by-side on the same routing layer) would be assumed, making the capacitance estimate "worst case."

Conventionally, the circuit blocks or "cells" are sized in accordance with such a worst case RC estimate. As a result, the cells may be sized too large for the actual routed signal paths and power consumption due to overdriven and non-optimal signal driving based on the actual load could be greater than necessary. Further, this problem gets worse as more advanced processes result in increased capacitance values.

For timing considerations, obtaining "timing closure" in conventional approaches may be more difficult due to the worst case estimates and this may further exacerbate the power consumption problem. Typically, capacitances of the actual resultant signal paths are extracted and provided to a simulator and/or timing closure tool. If the circuit meets the timing specifications for the design, timing closure has been obtained. However, if the circuit fails timing closure, adjustments to the circuit block placement and/or routing must be done. This process must be repeated until timing closure is met, delaying the completion of the overall design. In particular, overdriven signals resulting from such conventional solutions are susceptible to hold time violations. The signal paths must then be re-routed and/or the cells re-sized as part of one or more iterations in order to ultimately meet the timing constraints.

Given the increasing demands on circuit designers to more quickly create chips of increasing density, decreasing wire and transistor widths, and decreasing power supply and power consumption, it is difficult to ensure optimal cell sizing in an automated place-and-route flow. Increasing the complexity, flexibility and/or functionality of the circuitry on a chip exacerbates these challenges. Thus, what is needed is a tool with which integrated circuit designers can efficiently (i) route signals such that corresponding characteristics can be determined and/or estimated and (ii) size cells to better optimize power consumption, thereby facilitating timing closure in an automated place-and-route flow.

SUMMARY OF THE INVENTION

Embodiments of the present invention relate to methods, algorithms, software, architectures and/or systems for placing and sizing circuit blocks to optimize power consumption and improve timing closure in a circuit design.

In one embodiment, a method of placing and routing can include the steps of: (i) routing signal paths in one or more upper layers for connecting circuit blocks; (ii) adjusting the circuit blocks based on RC characteristics of the signal paths; and (iii) routing in one or more lower layers connections between the circuit blocks and the upper layers. The circuit blocks can include standard cells configured to implement a logic or timing function, other components, and/or integrated circuits, for example. The upper layers can include the three uppermost metal connectivity layers (e.g., metal-4, metal-5, metal-6), while the lower layers can include metal-1, metal-2, and metal-3, for example.

In another embodiment, a method of placing and connecting can include the steps of: (i) defining an array of layout partitions including a first subset of circuit blocks and a second subset of circuit blocks; (ii) routing a plurality of signal paths (preferably using one or more upper metal layers) between a first connection point substantially within a predetermined spacing from a corresponding one of said first subset of circuit blocks, and one or more second connection points, each substantially within said predetermined spacing from one or more of said second subset of circuit blocks; (iii) adjusting the circuit blocks based on characteristics (e.g., resistance, capacitance and/or inductance) of the signal path; and (iv) routing each signal path from the first connection point to the corresponding first circuit block and from the second connection point to the corresponding second circuit block(s) (preferably using lower metal layers). The first and second connection points can each include a via for connecting between the upper and lower layers.

In another embodiment, a connection of circuit blocks in an array of layout partitions can include circuit blocks electrically connected by signal paths. The signal paths can have upper layer portions coupled by first connection points to first lower layer portions, which connect to one or more of a first subset of the circuit blocks. The upper layer portions can also have second connection points to second lower layer portions, which connect to one or more of a second subset of the circuit blocks. The first and second connection points may not be farther than a layout partition spacing away from at least one of the circuit blocks. The layout partition spacing can be a diagonal of one of the layout partitions in an array of such partitions. The circuit blocks can be located in the layout partitions.

Embodiments of the present invention can advantageously reduce power consumption and improve timing closure in an automated place-and-route flow. Embodiments of the present invention are suitable for the automated placing of circuit blocks or cells and the routing of signal paths between circuit blocks within an integrated circuit (IC) and/or routing between ICs or components on a board, such as a printed circuit board (PCB).

These and other advantages of the present invention will become readily apparent from the detailed description of preferred embodiments below.

BRIEF DESCRIPTION OF THE DRAWINGS

FIG. 1 is a diagram showing a conventional wire routing estimation approach.

DETAILED DESCRIPTION OF THE PREFERRED EMBODIMENTS

Figure 2:
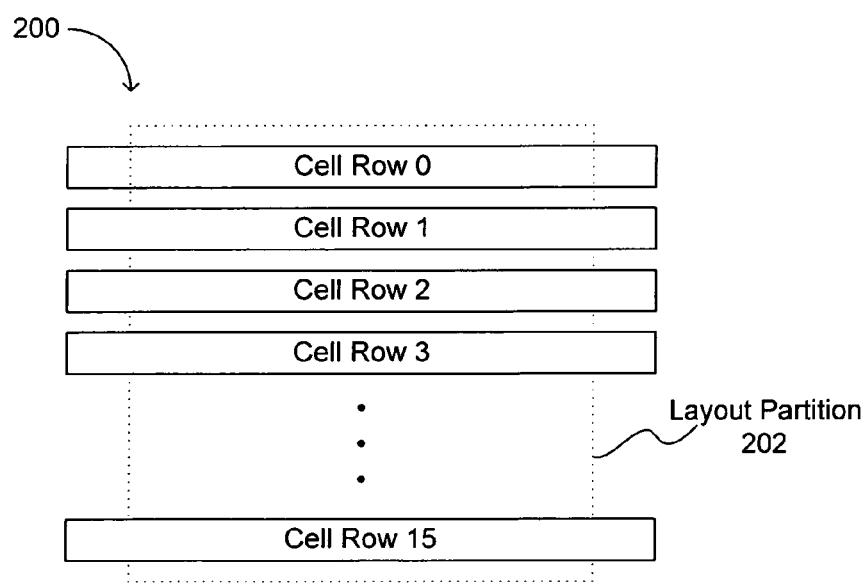
FIG. 2 is a box diagram showing an exemplary cell row arrangement within a layout partition structure according to embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, data streams or waveforms within a computer, processor, controller and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, in the context of this application, the terms "net list" (or "netlist") and "hardware description" may be used interchangeably to refer to a circuit design represented in an appropriate language, such as VERILOG simulation language, Hardware Description Language (HDL) or VERILOG HDL (VHDL; VERILOG is a registered trademark of Gateway Design Automation Corporation for computer aided electrical engineering programs). Similarly, the terms "wire," "wiring," "line," "signal," "conductor" and "bus" refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, as may (a) the terms "flip-flop," "latch" and "register," and (b) the terms "connected to," "coupled with," "coupled to," and "in communication with," but these terms are generally given their art-recognized meanings herein.

The present invention concerns a method and/or algorithm (e.g., a computer-readable set of instructions) for routing signal paths or connections between circuit blocks, and can include: (i) routing signal paths in one or more upper layers for connecting circuit blocks; (ii) adjusting the circuit blocks based on RC characteristics of the signal paths; and (iii) routing in one or more lower layers connections between the circuit blocks and the upper layers. The circuit blocks can include standard cells configured to implement a logic or timing function, other components, and/or integrated circuits, for example. The upper layers can include the three uppermost metal connectivity layers in a semiconductor fabrication process (e.g., metal-4, metal-5, and metal-6 in a 6-metal layer process), while the lower layers can include metal-1, metal-2, and metal-3, for example.

In a further aspect of the invention, software relates to a medium or waveform containing a computer-readable set of instructions, where the instructions can be adapted to perform a method including: (i) routing signal paths in one or more upper layers for connecting circuit blocks; (ii) adjusting the circuit blocks based on RC characteristics of the signal paths; and (iii) routing in one or more lower layers connections between the circuit blocks and the upper layers.

In another aspect of the invention, a method and/or algorithm of placing and connecting can include the steps of: (i) defining a plurality of layout partitions (e.g., in an array), including first locations for a first subset of circuit blocks and second locations for a second subset of circuit blocks; (ii) routing a plurality of signal paths using one or more first type layers (e.g., upper metal layers) between (A) first connection points within a predetermined spacing from a corresponding first circuit block and (B) second connection points within the predetermined spacing from one or more corresponding second circuit blocks; (iii) adjusting the circuit blocks based on characteristics of the signal path; and (iv) routing the signal paths using one or more first type layers (e.g., lower metal layers) from the first connection points to the corresponding first circuit blocks and from the second connection points to the corresponding second circuit blocks. The first and second connection points can each include a via for connecting between the first and second layer types (e.g., upper and lower metal layers).

In another aspect of the invention, a connection of circuit blocks can include a plurality of circuit blocks coupled together by signal paths having certain characteristics. The signal paths can have upper layer portions coupled by first connection points to first lower layer portions, which connect to one or more of a first subset of the circuit blocks. The upper layer portions can also have second connection points to second lower layer portions, which connect to one or more of a second subset of the circuit blocks. The first and second connection points may not be farther than a layout partition spacing away from at least one of the circuit blocks. The layout partition spacing can be a diagonal of one of the layout partitions in an array of such partitions. The circuit blocks are generally located in the layout partitions.

Embodiments of the present invention can advantageously reduce power consumption and improve timing closure in an automated place-and-route flow. In one implementation, a power consumption reduction of approximately 30% was realized. Embodiments of the present invention are suitable for the automated placing of circuit blocks or cells and routing of signal paths between circuit blocks within an integrated circuit (IC) and/or routing between ICs or components on a board, such as a printed circuit board (PCB).

The invention further relates to hardware and/or software implementations of the present architecture, method and system. The invention, in its various aspects, will be explained in greater detail below with regard to exemplary embodiments.

Referring now to FIG. 2, a box diagram showing an exemplary cell row arrangement within a layout partition structure according to embodiments of the present invention is indicated by the general reference character 200. The layout partition structure can be a square region of any size, for example. In one embodiment, the layout partition structure size can be user programmable based on particular design requirements. Further, Layout Partition 202 can be arranged to include 16 rows of circuit blocks or cells (e.g., Cell Row 0, Cell Row 1, ... Cell Row 15). Alternatively, any number of rows of cells can be chosen, such as $2^n$ rows, where n=1, 2, 3, etc. Each cell row can include power strips in one or two of the highest metal layers, for example. Such power strips may be connected or "strapped" by power lines running vertically where the rows are oriented horizontally, for example.

Figure 3A:
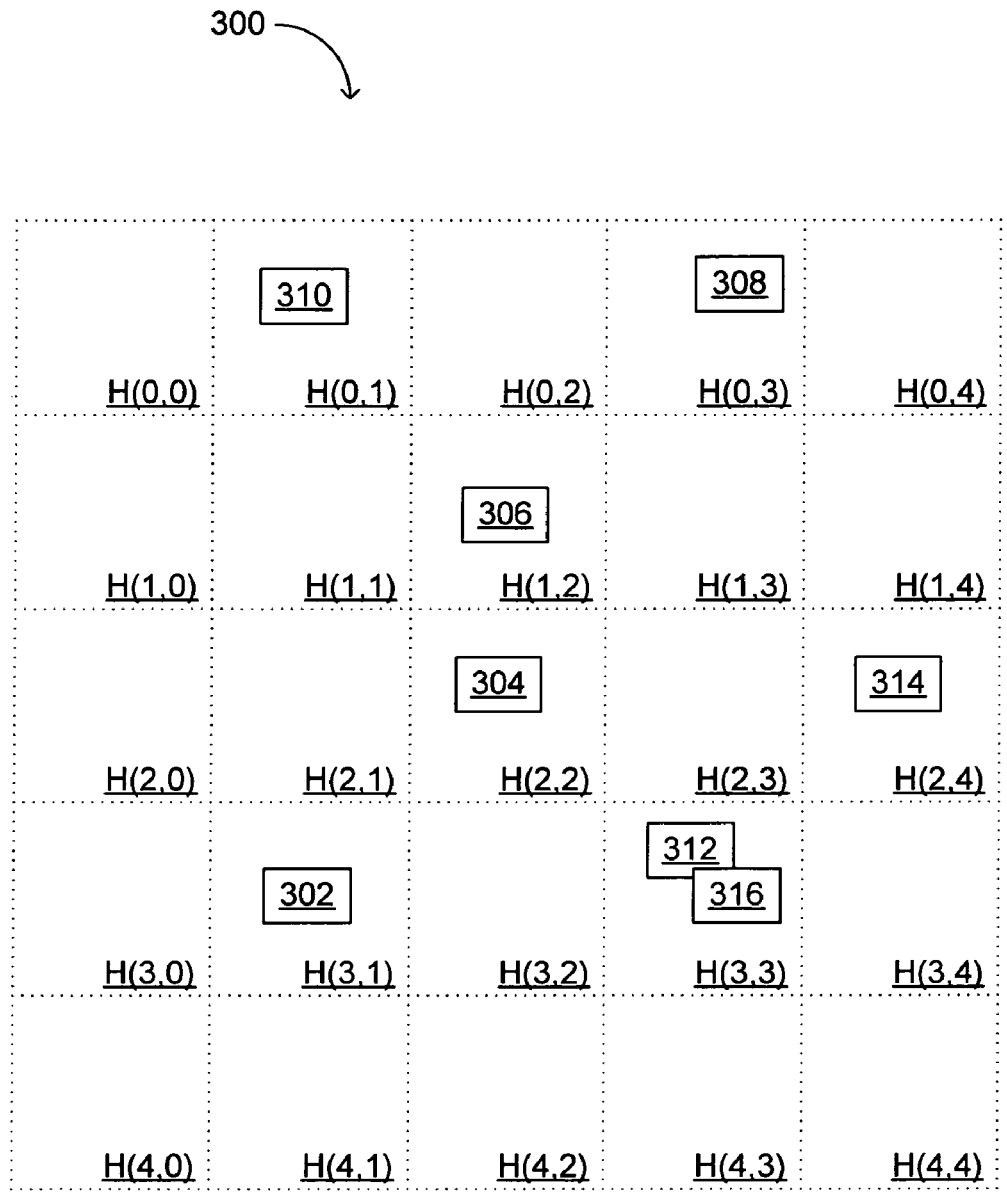
FIG. 3A is a layout view diagram showing an exemplary coarse circuit block or cell placement within a layout partition array according to embodiments of the present invention.

Referring now to FIG. 3A, a layout view diagram showing an exemplary coarse circuit block or cell placement within a layout partition array according to embodiments of the present invention is indicated by the general reference character 300. The layout partition array can be divided into layout partitions as shown [e.g., H(0,0), H(0,1), H(0,2), ... , H(4,3), H(4,4)] where each layout partition can be Layout Partition 202 of FIG. 2, for example. The array of layout partitions as in FIG. 3A can be any arrangement of layout partitions, such as organized as an "X" by "Y" array (e.g., X and Y can independently be 5, 10, 12, 16, or more). The size and shape of the overall array and/or of the layout partitions within the array may be driven by design considerations, such as the number of gates (where a "gate" may be a subset of or unit within a circuit block) in the design block as well as the process technology. For example, the layout partitions within the array may be sized such that each partition contains from about 20, 30 or 50 gates to about 250, 500 or 1000 gates, depending on the scale of the manufacturing technology. In one implementation, approximately 100 gates per layout partition in a 0.13 micron technology process provided good results.

In FIG. 3A, a "coarse" grid placement of circuit blocks or cells in layout partitions can include cell 302 in layout partition H(3,1), cell 304 in layout partition H(2,2), cell 306 in layout partition H(1,2), cell 308 in layout partition H(0,3), cell 310 in layout partition H(0,1), cells 312 and 316 in layout partition H(3,3), and cell 314 in layout partition H(2,4). In this stage of coarse circuit block placement, all placement and/or design rules need not be followed. For example, as shown in FIG. 3A, cells 312 and 316 may actually overlap at this point. Further, the cells may be placed outside the cell row structure as shown in FIG. 2, and rather, be placed in locations optimizing timing and/or overall wire length considerations.

In one embodiment, the layout partitions can be created after the coarse circuit block or cell placement is done. The coarse placement of cells can essentially be transformed into a layout partition structure. Alternatively, the layout partitions may be defined in advance. Further, the size of the layout partitions can be user-controlled. Also, high-fanout nets and/or signal paths can be buffered because it is known that such signals may need extra buffering regardless of the final load contribution due to wire routing. As is known to those skilled in the art, a multiple load and/or connection signal path may be considered a "high-fanout" signal path for automated routing purposes.

Figure 3B:
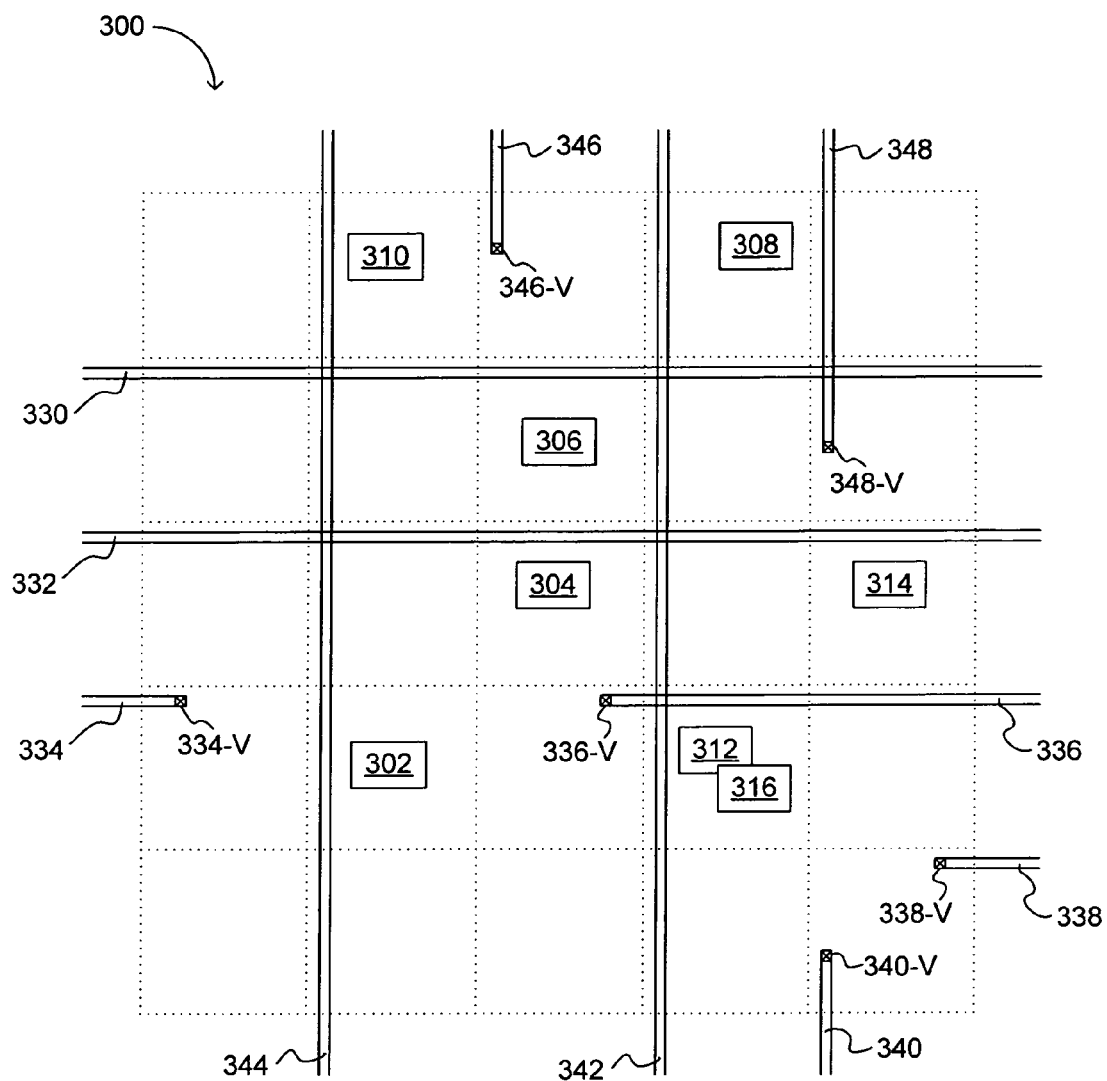
FIG. 3B is a layout view diagram showing an exemplary upper layer routing for the coarse cell placement of FIG. 3A according to embodiments of the present invention.

Referring now to FIG. 3B, a layout view diagram showing an exemplary upper layer routing for the coarse cell placement of FIG. 3A according to embodiments of the present invention is indicated by the general reference character 300. At this stage, cells may be treated as being located anywhere within a particular layout partition for upper layer routing purposes. As such, the upper layer routing may extend to within or about a boundary of a particular layout partition for ultimate connection (e.g., using lower layers) to any cell within that layout partition.

Typically, signal path routing is done using metal connectivity layers whereby a particular process technology may provide, for example, five or more metal layers. The lowest layer (i.e., the one closest to the substrate) is typically referred to as "metal-1" or "M1" and each subsequent metal layer is referred to as "metal-2," "metal-3," etc. Each such metal layer may be separated by a dielectric isolation layer. Alternatively or additionally, one or more of the metal layers may take the form of "damascene" or "dual damascene" metal layers deposited into trenches and/or vias in a dielectric isolation layer, as is commonly used in copper metallization. According to embodiments of the present invention, a designated set of metal layers can be classified as "upper" layers, such as the three highest metal layers (e.g., metal-4, metal-5 and metal-6 in a 6-layer metal process, or metal-6, metal-7 and metal-8 in an 8-layer metal process) in the particular process technology.

In FIG. 3B, upper layer metal routes 330 and 332 can pass through horizontally to provide connections to other circuit blocks (not shown). Similarly, metal routes 342 and 344 can pass through vertically to provide connections to other circuit blocks (not shown). Such horizontal and vertical tracks can be on different metal layers (e.g., the horizontal tracks on metal-4 and the vertical tracks on metal-5). For portions of signal paths that route fully through a layout partition, characteristics of that signal path may be determined using conventional techniques on a segment basis whereby a "segment" is the portion that spans the layout partition. Additional portions of signal paths that do not span a full layout partition may be characterized using conventional means as "remainders." The characteristics [e.g., resistance and capacitance (RC)] for a signal path can then be summed accordingly between all segments and remainders on the signal path. Alternatively, conventional approaches for determining such characteristics for a full signal path without regard to layout partition driven segmentation may also be employed.

In addition to strictly resistance and/or capacitance characteristics, any characteristics of a routed wire may be used in accordance with embodiments of the present invention. For example, time constants (the time required for a natural response on a signal to change by a certain amount), such as RC product time constants, may also be used. As another example, inductance characteristics of a wire may also be considered in some applications.

Where a connection to a circuit block is to be made (through lower connectivity layers), a via can be included to provide a path from the lowest "upper" layer to the highest "lower" layer. For example, if metal-4 is the lowest upper layer and metal route 334 (e.g., as other horizontal tracks) is part of a signal path that ultimately will connect to one of the cells (e.g., cell 302) shown, a via (334-V) can be included within one square or layout partition spacing away from cell 302. Such a layout partition spacing may be a diagonal of a square-shaped layout partition, a horizontal or vertical dimension of a square- or rectangular-shaped layout partition (typically the same dimension as the direction of the signal path terminating at the connection point), or some other predetermined distance, for example. As will be discussed in more detail below with reference to FIG. 3C, a connection between via 334-V and circuit block or cell 302 can then be made on one or more lower layers. Further, such a connection using lower layers may be strictly a "landing pad" or other such structure, as opposed to a horizontal and/or vertical routing connection to a circuit block.

Metal route 346 can similarly include via 346-V in proximity to cells 306, 308, and 310. Metal route 348 can include via 348-V in proximity to cells 308 and 314. For the vertical tracks that may be routed in metal-5, for example, a path down to metal-4 (one via) can be connected to another path down to metal-3 (another via) so that the lower layer routing can continue from that point. Metal route 336 can include via 336-V in proximity to cells 304, 302, 312, and 316. Metal route 338 can include via 338-V in proximity to cells 312 and 316. Metal route 340 can include via 340-V also in proximity to cells 312 and 316.

At this stage, when the upper layer (e.g., long wire) routing is complete, such routing is finalized. Accordingly, an extraction of resistance and capacitance (RC) characteristics of a routed signal path even at this stage is very accurate. Further, an estimate of the RC characteristics for the remaining routing to be done using lower layers can be included. In one implementation, the capacitance contribution of such lower layer routing amounted to less than 2% of the upper layer capacitance contribution. Accordingly, cell sizing based on the actual upper layer capacitance contribution plus an estimate of the lower layer capacitance contribution for a signal path is highly accurate. As discussed above, techniques for determining and/or estimating the characteristics of a signal path may include "segmented" plus "remainder" or full wire route considerations, each employing conventional extraction techniques.

In addition to the circuit block/cell sizing based on the capacitive load determination, the cell placements can be "legalized" or made to conform to placement and/or design rules. For such legalization, cells may remain in the same layout partition unless there is no available space in that layout partition. Cells on a layout partition boundary may be "snapped" to one layout partition. Further, such cell placement adjustments can be done to minimize the length of unrouted (i.e., those that contain no upper layer portions) signal paths. Also at this stage, Clock Tree Synthesis (CTS) buffer insertion can be completed.

Figure 3C:
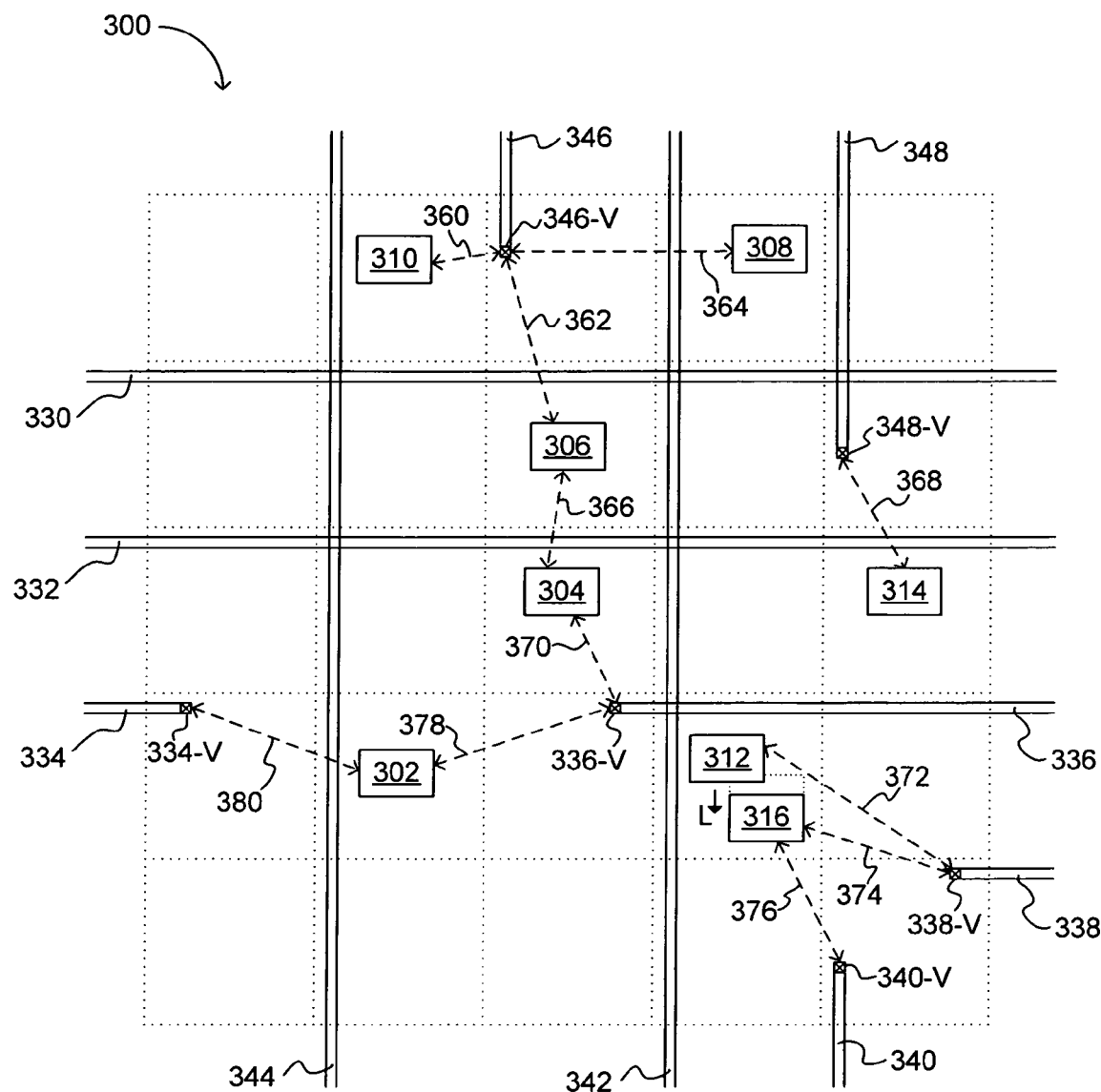
FIG. 3C is a layout view diagram showing an exemplary lower layer connection structure for the upper layer routing of FIG. 3B and the coarse cell placement of FIG. 3A according to embodiments of the present invention.

Referring now to FIG. 3C, a layout view diagram showing an exemplary lower layer connection structure between the upper layer routing of FIG. 3B and the coarse cell placement of FIG. 3A according to embodiments of the present invention is indicated by the general reference character 300. Connection 360 can be routed on one or more lower layers (e.g., metal-1, metal-2, and/or metal-3) between via 346-V and cell 310. While the lower layer connections are shown in FIG. 3C merely as dashed lines for illustrative purposes, one skilled in the art will recognize that the actual routing of such connections is typically made by horizontal and/or vertical metal layer routing paths. Also from via 346-V can be connection 362 to cell 306 and connection 364 to cell 308. As one skilled in the art will recognize, all such lower layer connections described herein can be made with any combination of such designated lower layers (e.g., metal-1 only, metal-1 and metal-2, or any two or all three lower layer metal layers) as needed or chosen for the particular signal routing path. Further, the layers designated as "lower" layers and "upper" layers for a particular design and/or process technology may vary. For example, in an eight metal layer technology, metal-1 through metal-4 may be designated as lower layers and metal-5 through metal-8 may be designated as upper layers.

Continuing with the lower layer connections of FIG. 3C, connection 366 can be made between cell 304 and cell 306 and connection 368 can be made between via 348-V and cell 314. From via 336-V, connection 370 can be made to cell 304 and connection 378 can be made to cell 302. From via 338-V, connection 372 can be made to cell 312 and connection 374 can be made to cell 316. Also from cell 316, connection 376 can be made to via 340-V. Finally, connection 380 can be made between via 334-V and cell 302. As also shown in FIG. 3C and as discussed above, the placement of cell 316 can be "legalized" from its original coarse placement position (see dashed box overlapping cell 312). Such a legalization adjustment is indicated by the arrow labeled "L" for the change in position of cell 316 to a current position that does not violate placement or design rules. Of course, such a placement adjustment is done prior to the lower layer routing.

In this fashion, the routing of signal paths between circuit blocks can be completed. Such routing may be formed substantially in lower layer metals if the circuit blocks or cells are within a layout partition spacing (e.g., a diagonal of a layout partition, as discussed above) apart. On the other hand, if the circuit blocks to be connected are more than a layout partition spacing apart, higher layer routing can be done for longer parts of the signal path routing and then lower layer routing can be used to complete the connections. Accordingly, connections of varying distances can be accommodated according to embodiments of the present invention whereby upper layer routing is finalized prior to lower layer routing.

As another aspect of embodiments of the present invention, a user can click on a layout partition and, using conventional software implementation techniques, obtain statistics related to that partition. For example, a percentage of utilization (i.e., circuit block placement area versus available area in the layout partition) for the layout partition can be displayed. Further, connections terminating in that layout partition can be highlighted. Such statistics and displays can facilitate a user option to manually override automatic placing or routing decisions and/or to better identify the appropriate layout partition size for optimized utilization. Also, an error condition (e.g., a flag indicating that the upper and/or lower layer routing cannot complete or that too many cells have been placed in one layout partition) may show that a chosen layout partition size is too small for the particular place and route application.

Figure 4:
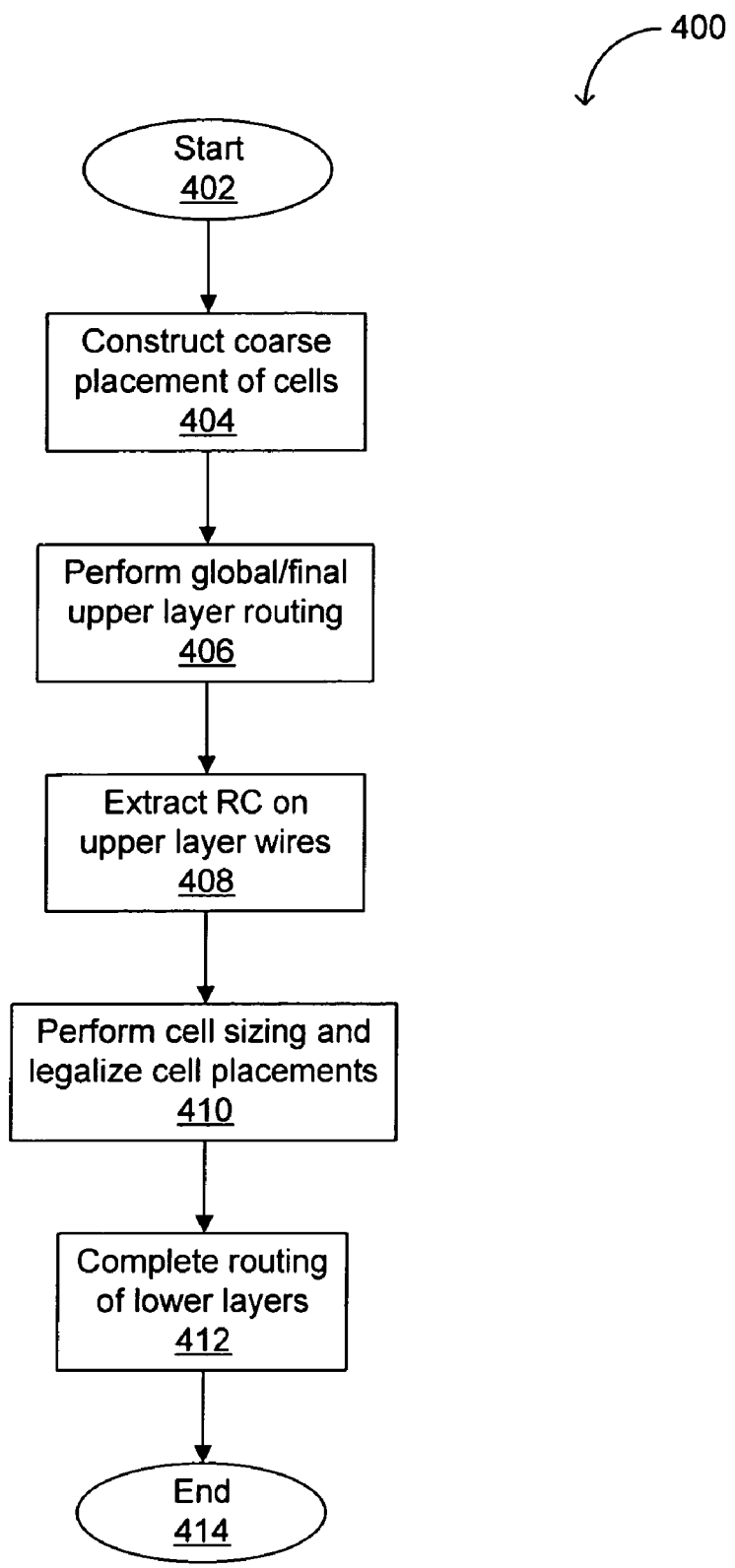
FIG. 4 is an exemplary flow diagram according to an embodiment of the present invention.

Referring now to FIG. 4, an exemplary flow diagram according to an embodiment of the present invention is indicated by the general reference character 400. The flow can begin in Start 402 and cells can be coarsely placed (404). The coarse placement of a cell can be within one of the layout partitions, for example. As discussed above, such layout partitioning can be defined after the coarse cell placement. Global routing using upper metal layers can be done (406) and such routing can be substantially "finalized" so that the routing will not change even if the circuit blocks requiring connection to a particular upper layer track do change. That is, the circuit block locations may change from an initial coarse block placement and/or the circuit block sizing may change, but the associated upper layer routing may not change.

Characteristics (e.g., actual RC values) for the metal routing on the upper layers can be extracted (408). Such extraction can be done, as discussed above, through conventional methods as applied to a full signal path route or through segments and remainders of a wire path, for example. Cells (i.e., circuit blocks) can be sized and the cell placements can be "legalized" (410) so that placement and/or design rules are not violated. Thus, in various embodiments and/or implementations, the first circuit blocks (or first subset of the plurality of circuit blocks) have a size and/or drive strength matched to resistance, capacitance and/or inductance characteristics of a signal path coupled to the circuit block. Next, the lower level routing can be done (412) and the flow can complete in End 414.

In general, embodiments of the present invention can be used in the placing of circuit blocks and the routing of signal paths between the circuit blocks or other routing termination points so that power consumption is minimized and timing closure is improved. However, while such power savings and timing closure improvements are more readily seen in digital full-swing type signals, embodiments of the present invention can also be used for "small signal" and/or reference or relatively stable level signals. Further, any type of signal suitable for automated routing (e.g., analog, digital, etc.) can be accommodated according to embodiments of the present invention.

Figure 5:
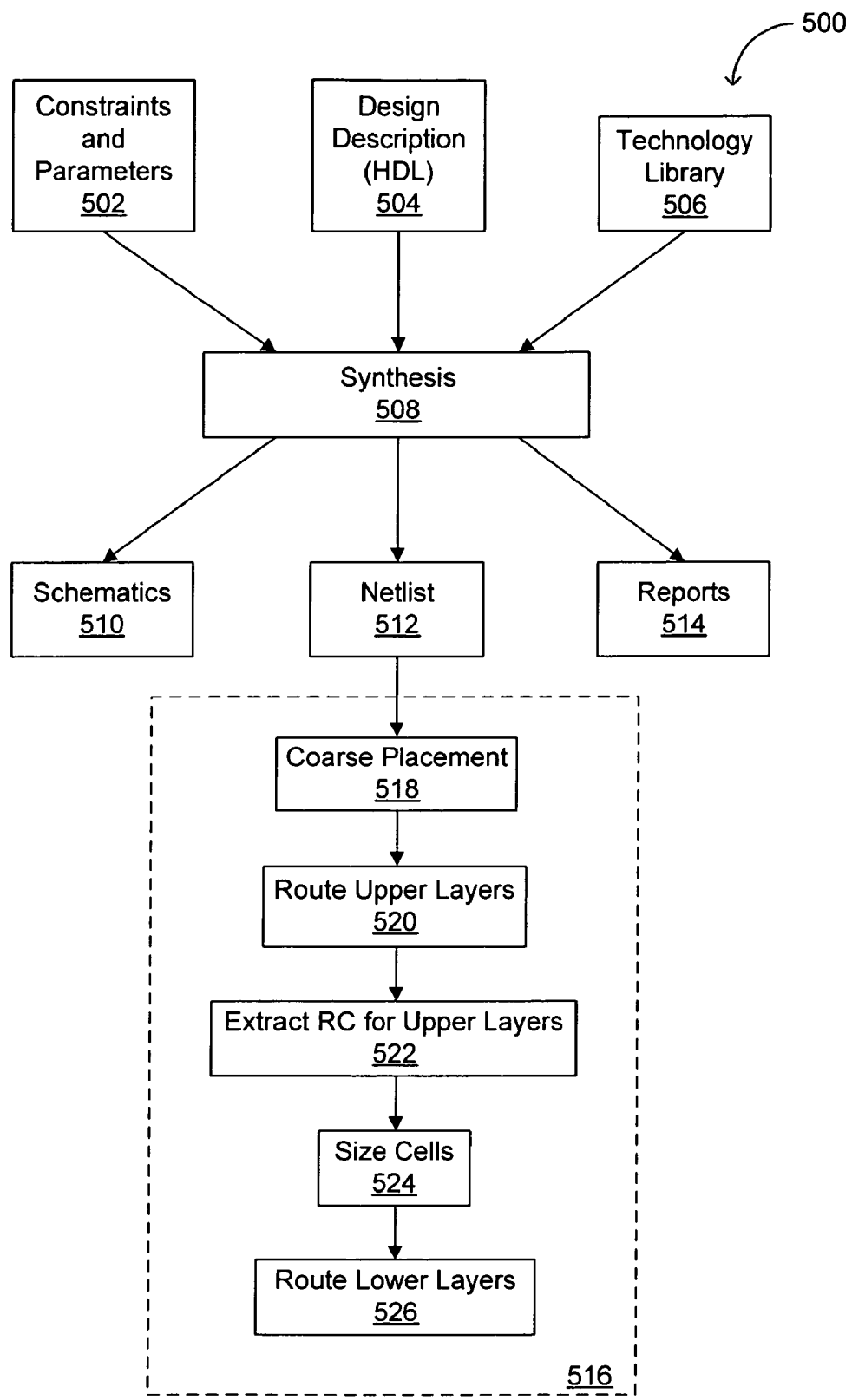
FIG. 5 is a box diagram showing a synthesis flow adapted for use with embodiments of the present invention.

Referring now to FIG. 5, a box diagram showing a synthesis flow adapted for use with embodiments of the present invention is indicated by the general reference character 500. Box 516 shows elements adapted for use in accordance with embodiments of the present invention. The remaining boxes in FIG. 5 represent a conventional synthesis flow. Inputs to Synthesis 508 typically include Constraints and Parameters 502, Design Description (HDL) 504, and Technology Library 506. Constraints and Parameters 502 may include physical expectations of the design, such as the circuit operating speed and/or the circuit layout area. Design Description (HDL) 504 can be a VERILOG HDL (VHDL) description of the logic operation(s) for synthesis. Technology Library 506 may contain a functional description as well as other information, such as may be related to the area and speed of all standard cells in a given process technology. For example, Technology Library 506 may be specific to a technology generation (e.g., 0.13 micron technology), a company (e.g., TSMC), and a process type (e.g., CMOS; eight-level metal; fast/normal/slow lot variation).

Outputs from Synthesis 508 may include Schematics 510, Netlist 512, and Reports 514. Schematics 510 can be schematic representations of the synthesized functions of Design Description (HDL) 504. Netlist 512 can be a text file description of a physical connection of components, such as standard cells, and can include a description of the various circuit blocks in the design and signal paths between the circuit blocks. Reports 514 can include speed and area data associated with results of Synthesis 508.

A netlist representation (e.g., Netlist 512) may be used for signal path determination, coarse cell placement and upper layer routing. Accordingly, Coarse Placement 518 can receive Netlist 512 and provide input to Route Upper Layers 520. For example, information about the location of cells in a design can be included in the input to Route Upper Layers 520. Extract RC for Upper Layers 522 can provide accurate RC information for the global/final upper layer signal path routes and feed the extracted RC information into Size Cells 524. Finally, the lower (remaining) layers can be routed in Route Lower Layers 526.

In this fashion, a conventional ASIC type design flow including synthesis can be adapted for placement of cells and routing of signal paths between the cells in accordance with embodiments of the present invention.

Further examples of suitable systems, tools and/or methods in which the present invention is generally applicable include those described in, e.g., U.S. Pat. Nos. 6,080,201 and 5,798, 936, the relevant portions of which are each incorporated herein by reference, and those commercially available from place-and-route software vendors such as Cadence Design Systems (e.g., the SILICON ENSEMBLE™, SILICON ENSEMBLE-PKS™, FIRST ENCOUNTER™, and NANO ENCOUNTER™ tools), Silicon Valley Research, Inc. (e.g., the QIC/APR™, GARDS™, SC™ and FLOORPLACER™ tools), Synopsys (e.g., the CHIP ARCHITECT™, DESIGN COMPILER™, and FLOORPLAN COMPILER™ tools) and Mentor Graphics (e.g., the AUTOCELLS™ tool).

Thus, embodiments of the present invention can advantageously reduce power consumption and improve timing closure in an automated place-and-route flow. Embodiments of the present invention are suitable for the automated placing of circuit blocks or cells and routing of signal paths between circuit blocks within an integrated circuit (IC) and/or routing between ICs or components on a board, such as a printed circuit board (PCB).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of placing and routing, comprising:
    a) dividing a layout area of an integrated circuit (IC) into an array, said array comprising a plurality of user-defined layout partitions, and said IC comprising at least six metallization layers;
    b) using a computer or data processing system, routing portions of a plurality of signal paths in one or more upper metallization layers to within a layout partition spacing of at least one of a plurality of circuit blocks in one of said layout partitions, said plurality of signal paths coupling to said plurality of circuit blocks in said layout partitions, and substantially finalizing said upper metallization layer signal path portions, wherein when the IC comprises at least eight metallization layers, the upper metallization layers consist of the four uppermost metallization layers, and when the IC comprises less than eight metallization layers, the upper metallization layers consist of the three uppermost metallization layers;
    c) extracting actual characteristics of said one or more upper metallization layer signal path portions and determining estimated characteristics for portions of said plurality of signal paths in one or more lower metallization layers, said lower metallization layers consisting of those metallization layers of the IC other than the upper metallization layers, wherein said characteristics comprise one or more members of the group consisting of: resistance, inductance, and capacitance;
    d) after finalizing said upper metallization layer signal path portions, adjusting said plurality of circuit blocks in response to said actual characteristics of said upper metallization layer signal path portions and said estimated characteristics of said lower metallization layer signal path portions; and
    e) routing said lower metallization layer signal path portions between said plurality of circuit blocks and said one or more upper metallization layers.

2. The method of claim 1, wherein the step of routing in said one or more lower metallization layers includes routing segments not substantially longer than a diagonal of one of said plurality of layout partitions.

3. The method of claim 1, wherein said characteristics include resistance and capacitance.

4. The method of claim 1, wherein the step of adjusting said plurality of circuit blocks includes changing a location of at least one of said plurality of circuit blocks when there is a placement or design rule violation.

5. The method of claim 1, wherein the step of adjusting said plurality of circuit blocks includes changing a size of at least one of said plurality of circuit blocks.

6. A non-transitory computer-readable medium comprising a computer-executable set of instructions adapted to perform the method of claim 1.

7. The computer-readable medium of claim 6, further including an instruction adapted to provide a division of a layout area into an array of a plurality of layout partitions.

8. The computer-readable medium of claim 7, wherein routing in said one or more upper metallization layers includes an instruction adapted to route to within one of said plurality of layout partitions of at least one of said plurality of circuit blocks.

9. The computer-readable medium of claim 6, wherein said characteristics include resistance, inductance, and/or capacitance.

10. The computer-readable medium of claim 9, wherein said characteristics include resistance and capacitance.

11. The computer-readable medium of claim 6, wherein adjusting said plurality of circuit blocks includes an instruction adapted to change a location of at least one of said plurality of circuit blocks if there is a placement or design rule violation.

12. The computer-readable medium of claim 6, wherein adjusting said plurality of circuit blocks includes an instruction adapted to change a size of at least one of said plurality of circuit blocks.

13. The computer-readable medium of claim 6, wherein said one or more upper metallization layers consist of the three highest metal layers.

14. The computer-readable medium of claim 6, wherein said layout partition spacing is not greater than a diagonal length of one of said layout partitions in said array.

15. The computer-readable medium of claim 14, wherein said layout partition spacing is not greater than a horizontal or vertical length of said one of said layout partitions in said array.

16. The computer-readable medium of claim 15, wherein said layout partition spacing is not greater than a horizontal or vertical length of said one of said layout partitions in said array.

17. The computer-readable medium of claim 15, wherein said circuit blocks are located in the layout partitions.

18. The method of claim 1, wherein said one or more upper metallization layers consist of the three highest metal layers.

19. The method of claim 1, wherein said layout partition spacing is not greater than a diagonal length of one of said layout partitions in said array.

20. The method of claim 19, wherein said layout partition spacing is not greater than a horizontal or vertical length of said one of said layout partitions in said array.

21. The method of claim 19, wherein said circuit blocks are located in the layout partitions.

22. The computer-readable medium of claim 21, wherein said circuit blocks are located in the layout partitions.

23. The method of claim 1, wherein said IC comprises 6 or 8 metallization layers.

24. A method of placing and connecting, comprising:
1) defining a plurality of user-defined layout partitions of an integrated circuit (IC), wherein a plurality of first locations of a first subset of circuit blocks and a plurality of second locations of a second subset of circuit blocks are within said plurality of user-defined layout partitions, and said IC includes at least six metallization layers;
2) using a computer or data processing system, routing portions of a plurality of signal paths using upper metallization layers between (i) a first plurality of connection points, each of said first plurality of connection points being substantially within a layout partition spacing from a corresponding one of said first subset of circuit blocks, and (ii) a second plurality of connection points, each of said second plurality of connection points being substantially within said layout partition spacing from one or more of said second subset of circuit blocks, wherein when the IC comprises at least eight metallization layers, the upper metallization layers consist of the four uppermost metallization layers, and when the IC comprises less than eight metallization layers, the upper metallization layers consist of the three uppermost metallization layers;
3) extracting actual characteristics of said one or more upper metallization layer signal path portions and determining estimated characteristics for portions of said plurality of signal paths in one or more lower metallization layers, said lower metallization layers consisting of those metallization layers of the IC other than the upper metallization layers, wherein said characteristics include resistance, inductance, and/or capacitance;
4) finalizing said upper metallization layer signal path portions, and adjusting said locations of said first and second circuit blocks in response to said actual characteristics of said upper metallization layer signal path portions and said estimated characteristics said lower metallization layer signal path portions; and
5) routing said lower metallization layer signal path portions from each of said first connection points to each of said first subset of circuit blocks and from each of said second connection points to each of said second subset of circuit blocks.

25. The method of claim 24, wherein said predetermined spacing is a diagonal of one of said first and second layout partitions.

26. The method of claim 24, wherein the step of adjusting said first and second circuit blocks includes changing a size of at least one of said first and second circuit blocks.

27. The method of claim 24, wherein each of said first subset of circuit blocks is at least two layout partitions away from a corresponding one or more of said second subset of circuit blocks to which it is coupled by one or more of said signal paths.

28. The method of claim 24, wherein said one or more upper metallization layers consist of the three highest metal layers.

29. The method of claim 24, wherein said layout partition spacing is not greater than a diagonal length of one of said layout partitions in said array.

30. The method of claim 24, wherein said IC comprises 6 or 8 metallization layers.

* * * * *